Jan. 1, 1935.  M. C. WERNER  1,986,310
MOTION TRANSMITTING MECHANISM
Filed Sept. 5, 1933   3 Sheets-Sheet 1

Inventor
MARION C. WERNER
By
Attorney

Jan. 1, 1935.  M. C. WERNER  1,986,310
MOTION TRANSMITTING MECHANISM
Filed Sept. 5, 1933  3 Sheets-Sheet 2

Inventor
MARION C. WERNER
By L. Edw Flaherty
Attorney

Jan. 1, 1935.  M. C. WERNER  1,986,310
MOTION TRANSMITTING MECHANISM
Filed Sept. 5, 1933  3 Sheets-Sheet 3
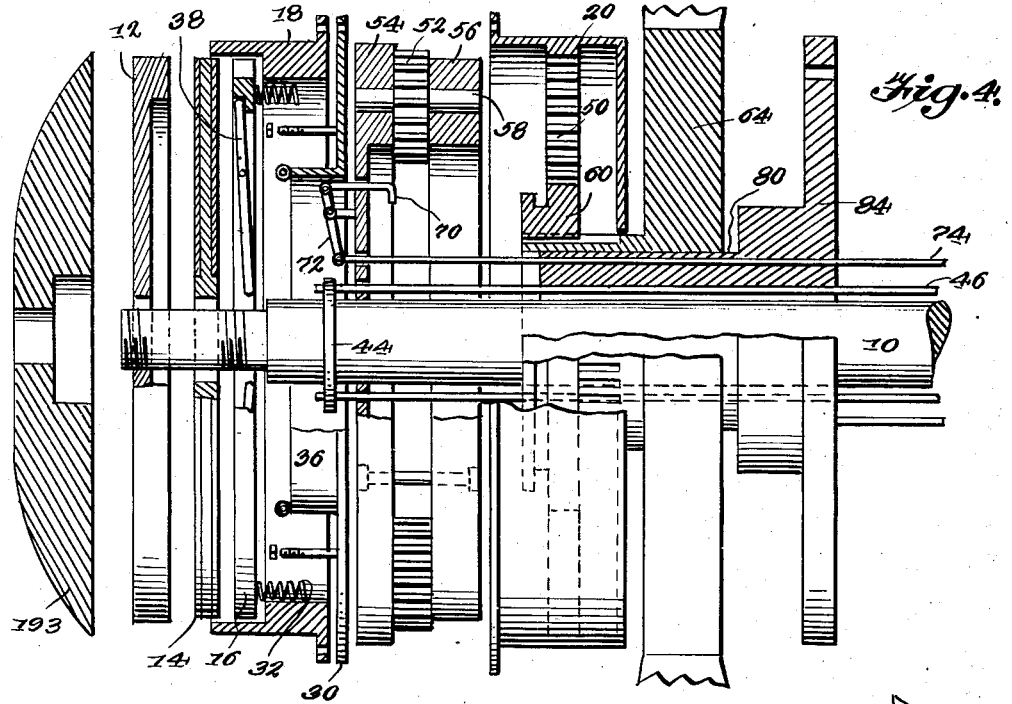
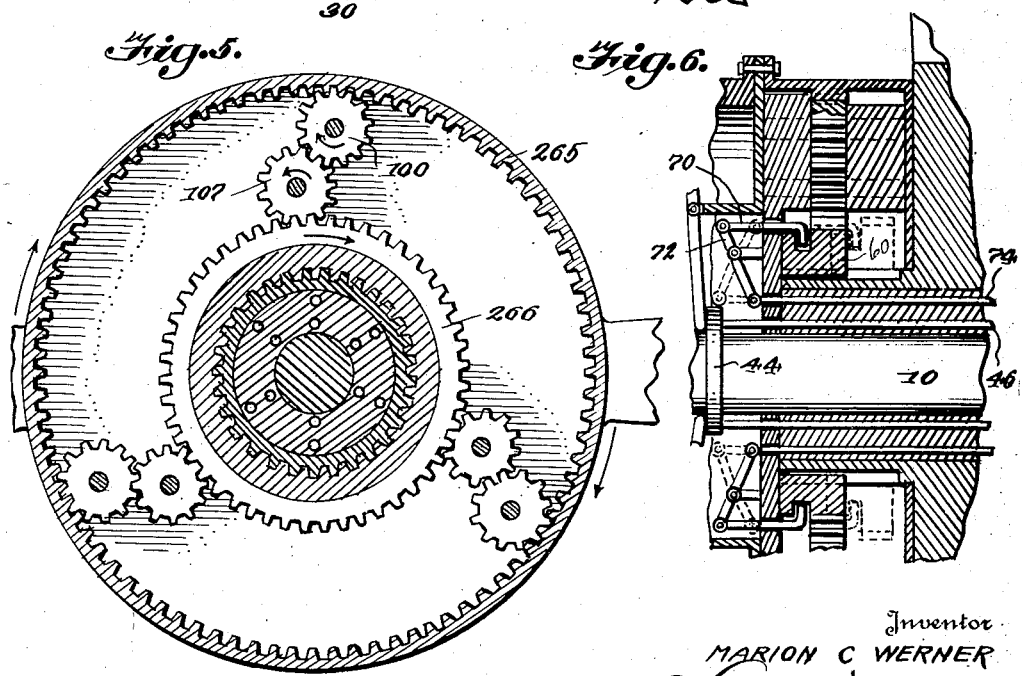
Inventor
MARION C. WERNER
By L. Edw Flaherty
Attorney Patented Jan. 1, 1935

1,986,310

UNITED STATES PATENT OFFICE 1,986,310

MOTION TRANSMITTING MECHANISM

Marion C. Werner, Hammond, Ind.

Application September 5, 1933, Serial No. 688,205

4 Claims. (Cl. 170—177)

This invention relates to a motion transmitting mechanism for use in connection with aircraft, although as will be seen, the invention is adaptable to other uses.

Briefly stated, one of the features of the invention has reference to a means by which the weight of the propeller is borne by a relatively fixed portion of the aircraft as distinguished from the conventional arrangement in which the weight of the propeller is borne by the crank shaft of the engine.

The invention also looks to the provision of reliable means by which the drive between the engine and the propeller may be interrupted or established, all at the will of the operator, thereby allowing the engine to be warmed up by idle running before the propeller is brought into play.

Also, the invention contemplates a speed change mechanism by which the speed of the propeller is greater than that of the engine to bring about increased efficiency both in the matter of air speed and ability to climb.

A further and equally important feature of the invention is to provide a motion transmitting mechanism of the character suggested which is adaptable to aircraft of conventional or other design and which may be incorporated in present day aircraft either during manufacture or at any time thereafter.

Other objects and advantages will be apparent during the course of the following description.

Figure 1:
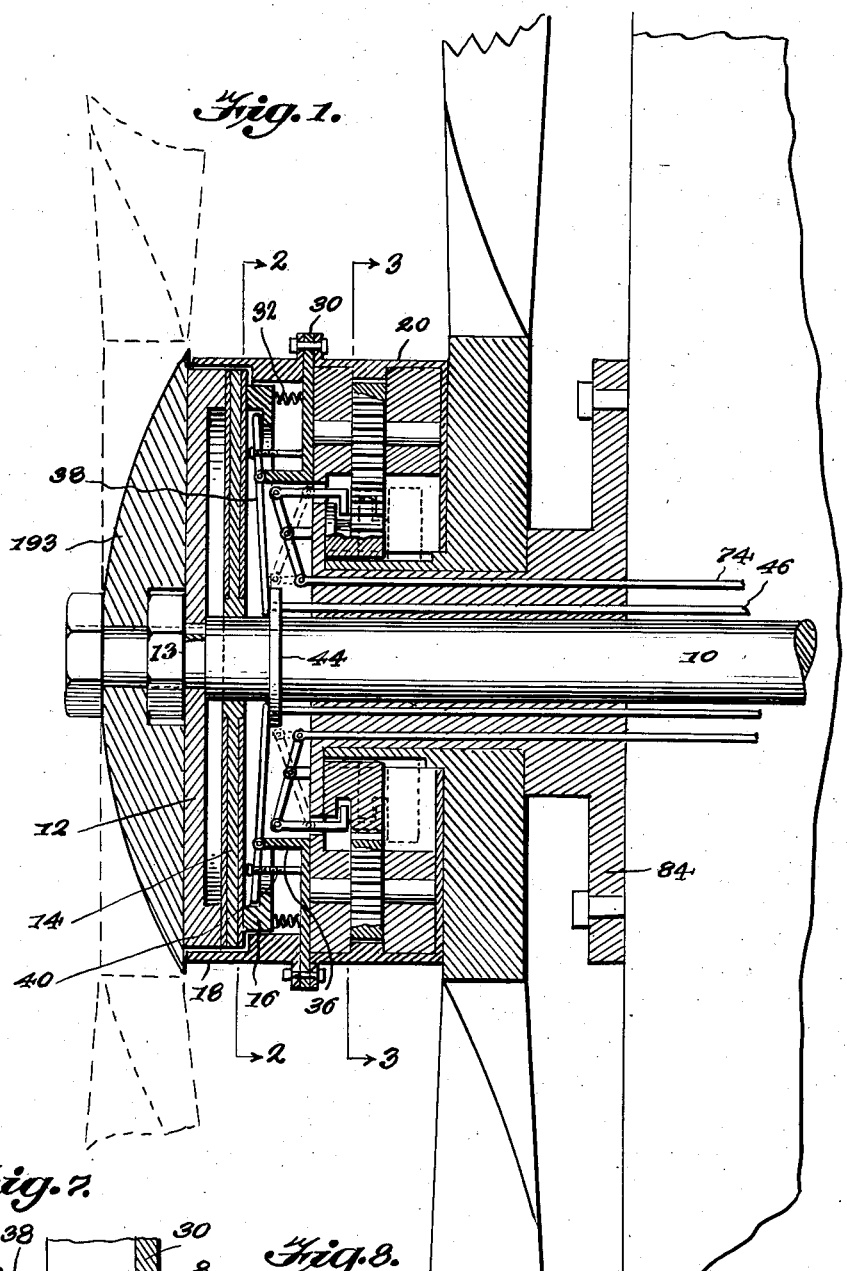
Figure 2:
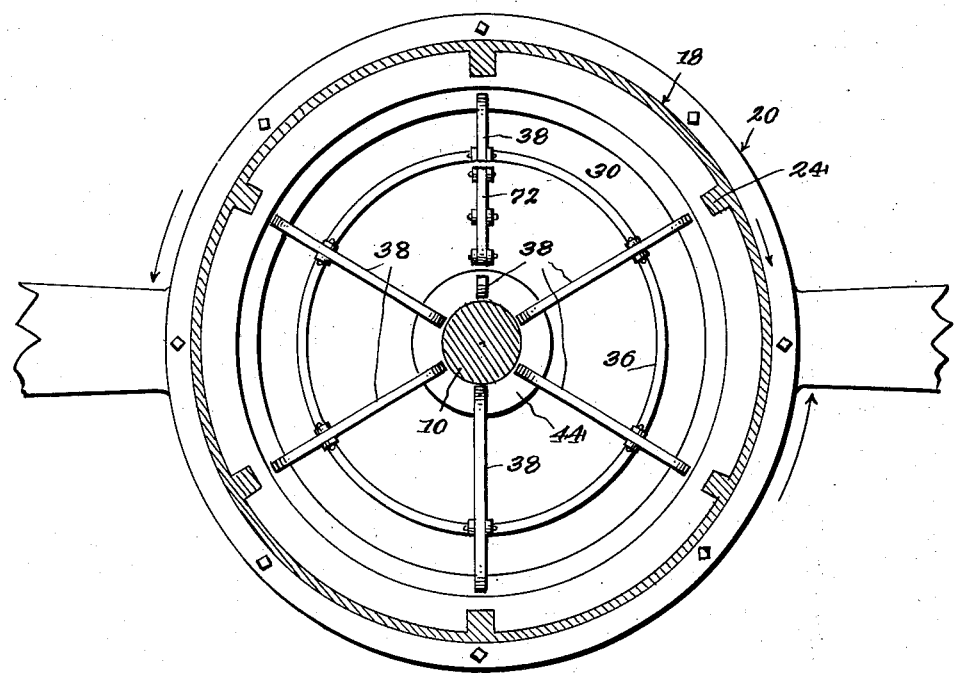
Figure 3:
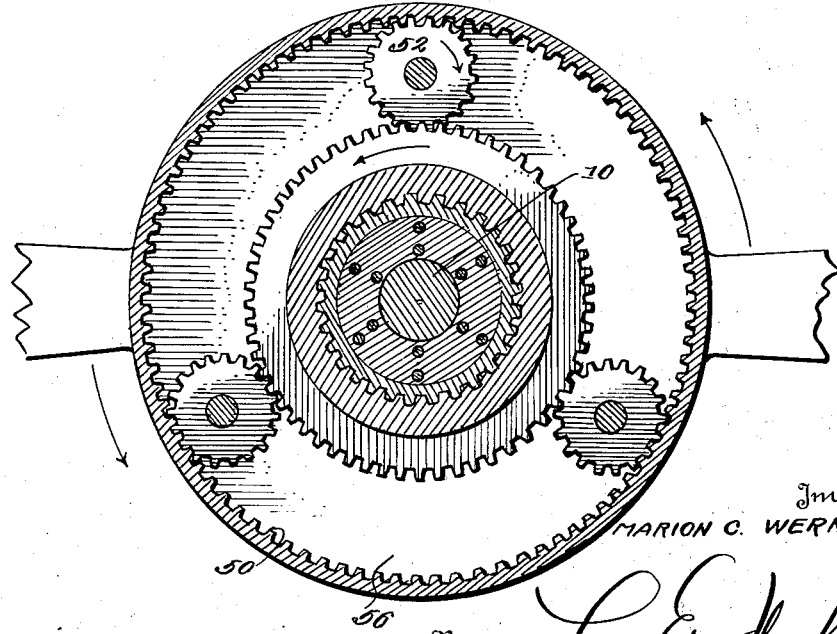

In the accompanying drawings, forming a part of this application and in which like numerals are employed to designate like parts throughout the same, Figure 1 is a vertical sectional view through the improved speed change mechanism in use, Figure 2 is a vertical transverse sectional view taken on line 2—2 of Figure 1, Figure 3 is a vertical transverse sectional view taken on line 3—3 of Figure 1, Figure 4 is a vertical sectional view through the improved motion transmitting mechanism the parts being slightly separated, Figure 5 is a vertical transverse sectional view through the mechanism and illustrating a means by which a clockwise drive is attained, as distinguished from the counter-clockwise rotation of the propeller as suggested in Figure 3, Figure 6 is a detail longitudinal sectional view through the speed change feature of the invention, Figure 7 is a detail sectional view illustrating the mounting of a lever embodied in the invention, Figure 8 is a sectional view taken on line 8—8 of Figure 7.

In the drawings, the numeral 10 designates a drive shaft, possibly the extended end of the crank shaft of an internal combustion engine of the type found on aircraft.

As shown in Figure 1, the terminal portion of the drive shaft 10 shown in Figure 1 is slightly reduced and has keyed thereon a clutch plate 12, a nut 13 or other suitable means being employed to hold the plate 12 securely in place on the drive shaft. By keying the clutch plate 12 on the drive shaft 10, such clutch plate is caused to turn with the drive shaft.

Now, in Figures 1 and 2 it is clearly illustrated that immediately inward of the clutch plate 12, there is a clutch disk 14 faced on opposite sides thereof with fiber or the like for engagement by the inwardly directed peripheral portion or contact area of the clutch plate 12. When the peripheral portion of the plate 12 is in frictional contact with the clutch disk 14 after the fashion disclosed in Figure 1, there is a driving connection between these two parts.

On the other hand, when the clutch disk 14 is out of pressure contact with the clutch plate 12, the driving connection between these two parts is interrupted.

With further reference to Figures 1 and 4, it will be seen that immediately inward of the clutch disk 14 and axially aligned therewith, there is a second clutch plate 16 having an axially enlarged peripheral portion defining what might be said to be an annular contact portion for frictional engagement with the clutch disk 14. Thus, when the clutch plate 16 is in pressure contact with the clutch disk 14 and the clutch disk is in pressure contact with the clutch plate 12, a driving engagement is established between these three parts.

It is illustrated in Figures 1, 2 and 4 that, between the clutch plate 16 and the surrounding section 18 of a housing 20 there is a sliding and non-rotatable connection allowing axial movement of the clutch plate 16 with respect to the surrounding section 18 while at the same time maintaining a rotary driving connection between these parts. In explaining this, particular attention is invited to Figure 2, in which it is illustrated that the section 18 of the housing 20 is provided at suitably spaced points with inwardly directed radial longitudinally extending lugs 24 fitting within appropriate grooves or slots in the peripheral portion of the clutch plate 16 allowing the clutch plate to move axially of the section 18 without disturbing the drive between these parts.

Between the member 18 and the body of the housing 20 there is an annulus 30 secured between the parts 18 and 20 by appropriate fastening devices such for example, as nuts or bolts. In carrying out the invention, suitable expansion coil springs 32 of helical form are confined between the clutch plate 16 and the annulus 30 and serve to bring about a driving connection between the parts 12, 14 and 16.

Coming now to the description of the means by which the driving connection between the clutch plates and the intervening clutch disk may be interrupted, attention is invited to Figure 1 in which it is illustrated that the annulus 30 is provided with a hub or collar 36 to which clutch levers or fingers 38 are pivoted.

More particularly, it is the intermediate portions of the levers 38 that are pivoted or fulcrumed to the hub portion of the annulus 30 and the outer portions of these levers 38 are engaged with the outer surfaces of the clutch plate 16. The clutch plate 16 is shown to be in the form of an annulus and when retracted through operation of the levers 38 is withdrawn from pressure contact with the clutch disk 14.

Set screws 40 are located in the path of travel of the levers 38 and provide a simple means for compensating for wear on various parts of the clutch.

The inner portions of the levers 38 are engaged with what might be said to be the forward surface of a collar 44, this collar being controlled by control rods 46. The control rods 46 have operative connection with the collar 44 and extend from the cockpit or other convenient place on the aircraft and provide a means by which the connection between the drive shaft 10 and the housing 20 may be de-clutched.

As illustrated in Figures 7 and 8, the levers 38 are movable through slots 467 in studs 468, the studs being mounted on the member 30. More specifically, the studs 468 are mounted axially and have the outer portions thereof formed with longitudinal slots receiving the adjacent portions of the levers 38. It will be seen that nuts 470 are threaded on the studs 468 outwardly of the levers 38 and provide a simple means by which the range of movement of the levers may be varied. That is to say, by retracting the nuts 470 the range of movement of the levers is increased. On the other hand, by advancing the nuts 470 the range of movement of the levers is diminished. This provides a simple means of compensating for wear on the various parts of the clutch. When the collar 44 is moved forward through actuation of the control rods 46 the levers 38 are rocked so as to retract the clutch plate 16. On the other hand, when the collar 44 is moved rearward or to the right as viewed in Figure 1, the springs 32 are allowed to expand and move the clutch plate 16 to the position shown in Figure 1 where a driving connection through the clutch is established.

Coming now to the speed change feature of the invention, attention is invited to Figure 4, in which it is illustrated that the housing 20 is provided between the ends thereof with an internal gear 50 surrounding a series of pinions 52 and in mesh therewith. These pinions 52 are mounted between supporting annuli 54 and 56, stub shafts 58 being extended through the annuli 54 and 56 and constituting supports for the pinions 52.

In carrying out the invention, the pinions 52 have constant mesh with the internal ring gear 50 and removable engagement with the external teeth of a gear 60. As shown in Figure 4, the gear 60 is keyed for longitudinal or axial movement on the hub 62 of the propeller 64. The mounting of the gear 60 provides a means by which the same may be engaged with the pinions 52 or removed therefrom.

When the gear 60 is in engagement with the pinions 52, a driving connection is established between the housing 20 and the propeller 64. On the other hand, when the gear 60 is moved out of engagement with the pinion 52, the driving connection between the housing 20 and the propeller is broken.

With particular reference to Figure 6 it will be seen that the gear 60 is provided with an external annular groove receiving the inwardly projecting terminal portions of fingers 70. The outer portions of the fingers 70 are surrounded by the collar 36 and have connection with levers 72. The levers 72 are fulcrumed after the fashion shown in Figure 6 and have connection at the inner ends thereof with longitudinally movable links or rods 74 with the result that movement of these links 74 will bring about longitudinal movement of the gear 60 for either establishing or interrupting the drive between the member 20 and the propeller.

It is believed to be clear that the transmission of the drive through the gears 50, 52 and 60 will operate the propeller 64 at a speed greater than that of the drive shaft 10 so as to bring about greater speed and lift on the part of the aircraft.

It is important to observe that the propeller 64 is mounted on an axially tubular extension 80 of an attaching bracket 84, the bracket being secured to a fixed part of the aircraft. By this arrangement, the weight of the propeller and the transmission is borne by a fixed part of the aircraft as distinguished from the fact that in aircraft of conventional design, the propeller is keyed or otherwise secured to the crank shaft and by reason of this the weight of the propeller is borne by the crank shaft.

The invention forming the subject of this application provides a means by which the drive between the engine and the propeller may be either broken or established at the will of the operator and from the cockpit. Thus, before taking off, the engine may be warmed up without a corresponding motion on the part of the propeller. When it is desired to take off, the clutch parts may be brought into the position suggested in Figure 1 to bring about a driving connection between the propeller shaft 10 and the propellers thereby bringing about a turning of the propeller at the desired speed.

Of course, in connection with the operation of the propeller, the parts of the transmission should be considered.

As illustrated in Figure 1, a rotary element 193 is secured rigidly to the shaft to turn therewith and this rotary element may be in the nature of a flywheel or a supplemental propeller.

In operation, it is merely necessary to advance the rods 46 and the annulus 44 so as to rock the levers 38 and thereby retract the clutch disk 16. From Figure 1 it will be apparent that the clutch disk 16 is retracted against the tension of the coil springs 32 and when the clutch disk 16 is retracted, of course, the driving engagement between the various parts is broken.

When the clutch has thus been actuated the gear 60 may be engaged with the surrounding gears 52. This is made possible through the members 70, 72, and 74. When the gears have thus been engaged the clutch may be operated to establish a driving arrangement.

In Figure 5, it is shown that a clockwise drive for the propeller may be brought about by the employment of a double set of gears 100 and 107 between the internal ring gear 265 and the external gear 266. This arrangement is important when twin motors are employed, one motor having a right hand drive while the other motor has a left hand drive.

It is to be understood that the form of invention herewith shown and described is to be taken merely as a preferred example of the same and that such minor changes in arrangement and construction of parts may be made as will remain within the spirit of the invention and the scope of what is claimed.

Having thus described the invention, what is claimed is:

1. In a structure of the class described, a bracket having means whereby the same may be secured to a relatively fixed portion of an aircraft, a propeller having a hub rotatably mounted on said bracket, a gear keyed to and slidable longitudinally with respect to the hub of said propeller, a set of gears for engagement with said first named gear, a housing having an internal gear constantly engaged with said set of gears, means to move said first named gear axially in and out of engagement with said set of gears, and a drive shaft rotatably extending through said bracket and having driving connection with said housing.

2. In a structure of the class described, a bracket having means whereby the same may be secured to a relatively fixed portion of an aircraft, a propeller having a hub rotatably mounted on said bracket, a gear keyed to and slidable longitudinally with respect to the hub of said propeller, a set of gears for engagement with said first named gear, a housing having an internal gear constantly engaged with said set of gears, means to move said first named gear axially in and out of engagement with said set of gears, a drive shaft rotatably extending through said bracket and having driving connection with said housing, and a clutch between said drive shaft and said housing.

3. In a structure of the class described, a housing having end walls, a pair of annuli between said end walls, gears carried by said annuli, said housing being provided with an internal gear in constant mesh with said first named gears, a gear inwardly of said first named gears, means for engaging and disengaging said last named gear with said first named gears, a clutch associated with said housing and having means to turn the housing, a propeller operated by the housing, and a bracket for supporting the housing and parts therein and the propeller and having means whereby the same may be secured to a relatively fixed portion of an aircraft.

4. In a structure of the class described, a housing having end walls, a pair of annuli between said end walls, gears carried by said annuli, said housing being provided with an internal gear in constant mesh with said first named gears, a gear inwardly of said first named gears, means for engaging and disengaging said last named gear with said first named gears, a clutch associated with said housing and having means to turn the housing, a propeller operated by the housing, a bracket for supporting the housing and parts therein and the propeller and having means whereby the same may be secured to a relatively fixed portion of an aircraft, and a drive shaft extending through said bracket.

MARION C. WERNER.